United States Patent
DiGiovanni

[11] Patent Number: 5,966,491
[45] Date of Patent: Oct. 12, 1999

[54] CLADDING-PUMPED FIBER STRUCTURE

[75] Inventor: David John DiGiovanni, Montclair, N.J.

[73] Assignee: Lucent Technologies Incorporated, Murray Hill, N.J.

[21] Appl. No.: 08/856,708

[22] Filed: May 15, 1997

Related U.S. Application Data

[62] Division of application No. 08/561,682, Nov. 22, 1995, abandoned.

[51] Int. Cl.$^6$ ...................................................... G02B 6/36
[52] U.S. Cl. .............................. 385/127; 385/89; 385/93; 385/33; 372/6
[58] Field of Search ..................................... 385/123, 127, 385/146, 88, 89, 90, 91, 92, 93; 372/6

[56] References Cited

U.S. PATENT DOCUMENTS 3,958,188  5/1976  Fletcher et al. ............................... 372/6

FOREIGN PATENT DOCUMENTS 0313209  4/1989  European Pat. Off. .................... 372/6

*Primary Examiner*—Hung N. Ngo
*Attorney, Agent, or Firm*—George S. Indig

[57] ABSTRACT

A cladding-pumped fiber structure, suitable for use as a laser, provides for efficient clad-to-core energy transfer. The outside interface of the pump-clad is constructed from a rod-shaped preform by local melt-displacement using an open flame.

10 Claims, 2 Drawing Sheets

CLADDING-PUMPED FIBER STRUCTURE

This is a divisional application under 37 CFr 1.60 08/561,682 filed Nov. 22, 1995, now abandoned.

BACKGROUND OF THE INVENTION

1. Field of the Invention

Cladding-pumped fiber structures such as lasers and amplifiers.

2. Description of Related Art

U.S. Pat. No. 5,418,880, May 23, 1995 is representative of the relevant art. The cladding pumped laser is an answer to the need for a high-power fiber laser. It relies on a multi-mode (pump) cladding for accepting and transferring pump energy to an active core along the length of the device through the core-clad interface. Energy is guided within the pump cladding by a second cladding of lower index of refraction. The configuration is likely to be used in fiber amplifiers as well as in fiber lasers.

The structure was immediately recognized as promising, and attention was soon directed to design optimization. Communication fiber had not been designed for the purpose. The need for more effective introduction of pump energy into the cladding, e.g. from a laser array, led to use of claddings of enlarged cross-section. The usual, circularly symmetrical, design used for communication fiber was no assurance of effective clad-to-core energy transfer, as it produced pump modes of helical paths which did not cross the clad-to-core interface. Reconsideration of fundamental parameters such as index profile were restudied as well. See, *Optics Commun.*, vol. 99, pp. 331–335 (1993).

U.S. Pat. No. 4,815,079, Mar. 21, 1989, improves coupling efficiency by either of two approaches. In the first, the core is placed off-center within an otherwise circularly symmetric structure. The second uses a high aspect-ratio rectangular pump cladding enclosing a centrally-located core. Both increase incidence of interface crossings by pump modes, and improve transfer efficiency. In common with other suggested structures, a second (outer) clad of lower index than that of the first (pump) clad, guides pump energy within the multi-mode pump clad.

U.S. Pat. No. 5,418,880, largely directed to structures for effectively coupling the output of a diode array into the pump cladding, also considers non-circular inner cladding designs. It proposes any of various polygonally shaped pump claddings—three-, four- and six-sided, some regular, some irregular—within outer claddings of low-index organic polymer. The design objective is uniform distribution of pump energy across the fiber cross section, assuring effective transfer.

Asymmetric structures are difficult to align and to splice to conventional transmission fiber. Rectangular and other irregular polygonal cross-sections also pose a problem. By all accounts, regular polygonal pump claddings deviate least from circularly symmetric structures and are preferred.

The structures of these patents do improve clad-to-core coupling efficiency, but fabrication is problematic. Manufacture of off-center preforms and procedures for drawing from such preforms do not use established technology. Fabrication of polygonal preforms from conventional round preforms by grinding and polishing is costly. Strength may be compromised—incidence of breakage under stress is increased by jagged surface features retained from machining.

SUMMARY OF THE INVENTION

High coupling-efficiency cladding-pumped fiber structures, operationally at least equivalent to polygonal-cladding structures of the prior art, are made without need for machining. A longitudinally traversing heat source shapes the still exposed outer surface of the pump cladding. Shaping is, to some extent, due to ablation. Using a flame heat source, shaping may be partly due to melt-induced viscous flow. Fabrication by use of this "melt process" transforms an initially round form into one which resembles the polygonal form of earlier structures.

A typical, regular shape is produced by use of a constant temperature source, traversing at constant speed. Evenly spaced troughs produced under uniform heating conditions produce regular, centrosymmetric shapes. As in earlier work, double and triple clad preforms, with claddings of successively lower index of refraction, yield structures which lessen energy leakage, and contribute to effective energy transfer. Under appropriate deposition conditions, final fibers may have surfaces which approach the smooth circular form of transmission fiber. The triple clad structure better approaches this and results in cleaving properties similar to those of conventional fiber.

Conditions used in melt-process fabrication have yielded interfaces which approach flat-sided structures produced by prior art grinding and polishing. Other conditions replace flats which concave surfaces. Such processing conditions, and resulting curved interface fiber structures, constitute a preferred embodiment. Jagged corners are inherently avoided, and this facilitates cleaving and aids in handling. Operationally, angle of incidence for pump energy at the interface is varied so that uniform energy distribution across the fiber cross-section is assured. This further improves core-to-clad energy transfer. Minimal concavity defining this preferred embodiment is prescribed.

Contemplated uses include cladding-pumping of the enclosed core either to excite to an emitting state—for lasing, for incoherent emission, or for amplification of a lightwave signal—or to introduce energy into a passive core, thereafter to be transferred to a following part of the circuit.

TERMINOLOGY

Precursor Preform—The virgin preform, consisting of core and pump cladding, prior to melt processing.

Processed Preform—Preform following melt-processing.

Final Preform—Preform from which fiber is drawn.

Melt-Process—The procedure by which the precursor preform is converted to the processed preform.

Trough—Feature produced by traveling heat source resulting from material removal by viscous flow and ablation. While generally concave, under some processing conditions the "trough" may appear as a flat-sided featureless chord-bounded region.

Concavity—The maximum depth of a trough relative to a planar bridging surface making glancing contact with either side of the trough, with the dimension measured radially within the preform.

DETAILED DESCRIPTION

Figure 1:
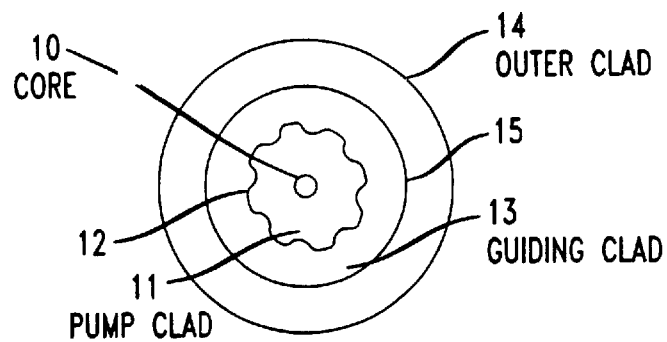
FIG. 1 is a cross-sectional view of a preferred triple-clad structure.

Structure—The triple-clad structure of FIG. 1 consists of centrally-positioned single mode core 10 within a multi-mode pump cladding 11. The pump cladding forms interface 12 with a second cladding 13. Third cladding 14 forms a more nearly circular interface 15 with the second cladding. A triple-clad structure, described in Example 2, was constituted of silica-based glass core, pump clad and second clad, all enveloped by an organic polymeric third clad.

Figure 2:
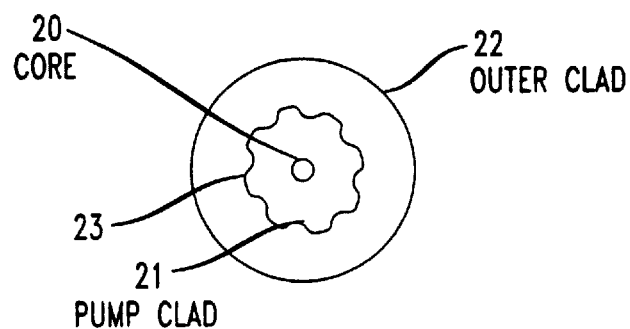
FIG. 2 is a cross-sectional view of a double-clad structure.

The double-clad structure of FIG. 2 consists of core 20 and first cladding 21, both generally of silica-based glass and final polymeric cladding 22, forming interface 23 with the inorganic glass structure. The FIG. 1 structure retains the operating characteristics of FIG. 2, but facilitates cleaving.

The advance may be viewed as an extension of earlier work (U.S. Pat. No. 5,418,880). By departing from a smooth featureless circular interface, the probability of non-intersecting mode paths is decreased. Fabrication of that polygonal interface is facilitated by melt processing.

The preferred embodiment replaces the flats of prior art structures with curved surfaces. Operationally, this preferred embodiment expedites energy transfer from the core to the clad by better avoiding large diameter helical energy paths which do not cross the core. Homogenization is assured by continuously varying angle of incidence at the constraining interface of the pump cladding. While the curved surface may not be a simple geometric shape, it is convenient to describe it in terms of the troughs which result in every form of the preferred embodiment regardless of heat source. To satisfy requirements of the preferred embodiment, the trough must have a minimal depth of 3%, or preferably 5% or greater, as measured relative to the radial distance from the center of the preform to a plane making glancing contact with the processed preform on either side of the trough.

As resulting from open flame melt processing, formation of the trough is at least partly due to displacement of molten glass caused by the incoming gas stream. This causes molten material to "overflow" the depression, resulting in protrusions between the troughs, and in a processed peripheral surface constituted of sequential concave and convex surfaces. Such a processed surface is best assurance of energy uniformity. The effect is optimized by flow velocities as high as can be maintained without extinguishing the flame.

If desired, for whatever reason, by maintaining low velocity gas flow to the burner orifice, or by substituting a different form of heat source, ablation may replace viscous flow as the primary or sole mechanism for trough formation, thereby minimizing convex protrusions. In its limit a trough produced under these conditions has a depth of 0%.

Energy transfer effectiveness assured by the preferred embodiment requires a minimum degree of surface curvature defined in terms of a minimum trough width of at least 15%. This is the percentage that the angular extent of the trough bears to that of the angle equal to 360° divided by the number of troughs.

Preference for a regular cross-sectional shape is based on practical rather than fundamental considerations—for ease of splicing and fabrication of succeeding layer(s). Enhancement in coupling is related to size and shape of individual troughs. The number of troughs is a factor as well. Feasible depth decreases as number increases, and the smooth featureless character of the precursor preform is eventually approached. Increasing number increases processing costs. On balance, three- to six-sided processed structures are preferred.

The structures shown in FIGS. 1 and 2 provide for containment of energy in the pump cladding. In FIG. 1, the function is served by a second glass cladding layer 13 together with polymeric cladding 14, with the two forming interface 15. Claddings 13 and 14 are of successively lower refractive index than pump cladding 11. Cleaving facility is affected in accordance with the degree to which the final glass-polymer interface approaches featureless circularity. A second glass-cladding tends to even out undulations. The change in elasticity at the interface 12 is small so that it has relatively little effect on cleaving.

A glass-polymer interface offers an operating advantage. Its differential index of refraction may be far greater than permitted between silica-rich compositions that differ only in minor dopant content. Experimental embodiments have used fluorinated polymers with indices of the order of 1.32 as compared with 1.46 for the highest index glass composition used in these structures.

Coating technology developed for transmission fiber is useful in preparation of a polymeric cladding. The specific UV-cured materials, generally resulting in increased refractive index, may be replaced for example by use of a fluorine-doped polymer. Maximized through-put may not be as significant for fabrication of specialty (laser, amplifier, inert-core) fibers, so that thermally-cured materials may afford some increased flexibility in prescription of polymeric clads.

Unless otherwise indicated, use of the term "cladding" is intended to connote (low index) guiding layers, and is not intended to include protective coatings of higher index than that of underlying material.

Effective operation of the cladding pumped laser depends on collection area. Whether a double or triple-clad structure, outer claddings serve for accepting and transferring introduced energy into the pump clad, and are a part of the collection area. The inventive thrust of the preferred embodiment, however, is not equally served. Enhanced energy transfer is due to the pump cladding. The thickness of outer claddings is, accordingly, minimized—that of the pump cladding maximized—commensurate with other considerations.

A preferred structural embodiment has an outer surface approaching that of the smooth featureless surface of transmission fiber. The cladding surrounding the pump-cladding (the second cladding) is desirably of sufficient thickness to accommodate undulations in the outer surface of the pump-cladding. To achieve this purpose, this second cladding is necessarily of thickness somewhat greater than the difference between the radially measured minimum and maximum thickness of this cladding. Any polymer cladding serves little purpose beyond guiding. A thickness of 15 $\mu$m is adequate.

Large total cross-sectional area of combined glass claddings is always desired for collection efficiency. For the usual single-mode core, and for the total cross-sectional area of a conventional 125–150 $\mu$m diameter communication fiber, the clad/core ratio of cross-sectional areas is generally in the range of 100–300. Usually the limiting criterion, splicing expediency is not significantly impaired by same size mismatch. The cladding-pumped structure may be double that of the fiber to be spliced.

Figure 3:
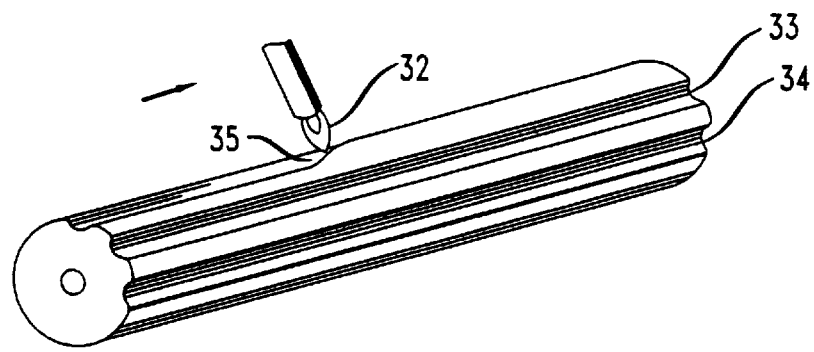
FIG. 3 is a perspective view showing a cladding-pumped device in fabrication.

Process—FIG. 3 shows a round precursor preform being shaped by the melt process. Initially, a conventional fiber preform constituted of core 30 and cladding 31, a longitudinally traversing heat source 32 is making troughs. At the stage depicted, two complete traversals have been made, one resulting in trough 33, and the second in trough 34. A third trough 35 is in the course of production.

For a silica-rich preform material, a glass surface temperature of 2100° C. or higher is adequate. Experimentally, an oxy-hydrogen flame as effective in construction of a hexagonal structure meeting requirements of the preferred embodiment.

Conventional processing follows preparation of the processed preform. In fabrication of the triple-clad structure, and in some forms of double-clad structure as well, additional cladding material is added. Addition may be by any of the usual vapor-transport processes, e.g. MCVD, OVD, VAD or by other means of deposition. Alternatively, the processed preform may be inserted in a free-standing, overcladding tube, which is then collapsed to produce a "composite" final preform.

Fiber drawing of a preform which in its entirety is made of silica-rich glass, may follow conventional practice. See, S. R. Nagel, "Fiber Materials & Fabrication Methods" in *Optical Fiber Telecommunications II*, S. E. Miller and I. P. Kaminow, Academic Press 1988. Conventional practice, with a view to cost, provides for maximum draw speed generally as limited by coating application/curing. Surface features on the processed preform are not reliably retained under such draw conditions. Retention still with reasonable throughput, is assured by operating at the lower temperature (higher tension) part of the range. Melt-processing does not ordinarily leave jagged corners or other features which might require reduced draw speed. If preform overcladding is of some lower-melting glass material, account must be taken of this variation in prescribing suitable draw conditions.

Examples 1–3 report experimental conditions used in preparation of double-clad and triple-clad structures.

EXAMPLE 1

A 15 mm diameter round precursor preform constituted of a 0.7 mm core of 0.2 wt. % $Nd_2O_3$, 3% $P_2O_5$, 2% $GeO_2$, remainder $SiO_2$, within an undoped $SiO_2$ clad of length 30 cm was fabricated by MCVD. The precursor preform was mounted on a glassworking lathe and traversed longitudinally by an oxy-hydrogen torch. The burner had a single 3 mm orifice and was spaced at 15 mm from the preform. With traversal speed of 50 mm/min., gas flows were adjusted to attain a glass surface temperature of 2200° C. The resulting trough was 1.5 mm (6%) deep and 50% wide. After each traverse, the preform was rotated 60° so as to develop a hexagonal pattern of concave surfaces.

The processed preform was drawn into fiber of 140 μm od at a draw speed of 0.4 meters/sec., was coated with a fluorine-containing oligomer and was UV-irradiation cross-linked to result in a cured coating of 50 μm thickness. Concavity in the drawn fiber was little changed from that of the preform.

EXAMPLE 2

A processed preform was prepared as in Example 1, however, starting with a precursor preform of 0.81 mm core and 15 mm clad. Following melt-processing to produce a processed preform of regular six-sided shape, it was fire-polished and inserted in a fluorine down-doped silica overcladding tube of 15.8 mm id and 19 mm od (of 86 mm² cross-section), a vacuum was pulled between the rod and the tube, and the assemblage was constantly rotated while scanning with an oxy-hydrogen torch to collapse the tube. Fluorine-doping was sufficient to yield a refractive index change of –0.006 relative to underlying undoped silica and to produce an NA of 0.13 between the pump-cladding and the second cladding of the final preform. The outer surface showed vestigial undulations of ±0.2 mm. The composite rod, now of the same clad/core ratio of 460 as in Example 1, was drawn into fiber of 140 μm od. It was coated during drawing as in that Example.

EXAMPLE 3

Desirable use of a high-power rare-earth-doped fiber amplifier, for use at an operating wavelength of 1550 nm, has required substitution of the usual erbium-doped amplifier with one that contains ytturbium as well—with an absorption from 850 to 1100 nm. Such an Er-Yb-doped fiber amplifier may be fabricated in the manner of Example 1. For this purpose, dopant –0.17 mol. % Er+2.6 mol. % Yb is used in lieu of $Nd_2O_3$. Other dopant material in the amount indicated in Example 1 is used. Fabrication is conducted under the same conditions to yield the same structure.

OPERATION

Figure 4:
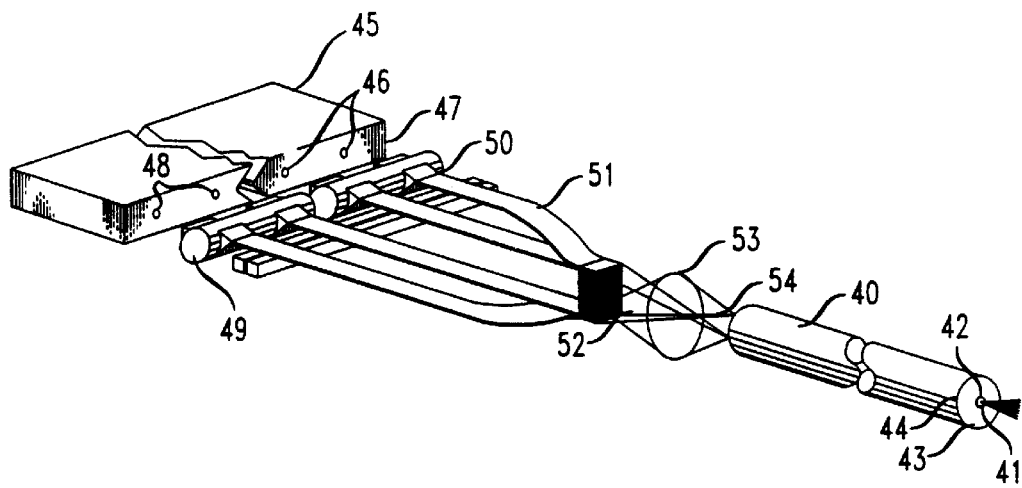
FIG. 4 is a perspective view showing a cladding pump structure coupled to a diode array.

FIG. 4 taken from U.S. Pat. No. 5,268,978, but substituting a preferred trough-containing structure, shows an arrangement for coupling with a diode array. The cladding pump structure 40 is triple-clad and is constituted of core 41, pump clad 42, second clad 43, and third clad 44. The energy source for pumping structure 40 is a diode array 45 consisting of four diodes 46 within a suitable encapsulant 47. Diode radiation is depicted as cones 48, collected by cylindrical lens 49. Focused radiation 50 is made incident on guides 51 which are bundled to yield a cone 52 of emanating radiation, which is focused by convex lens 53 to form beam 54 directed to structure 40.

Figure 5:
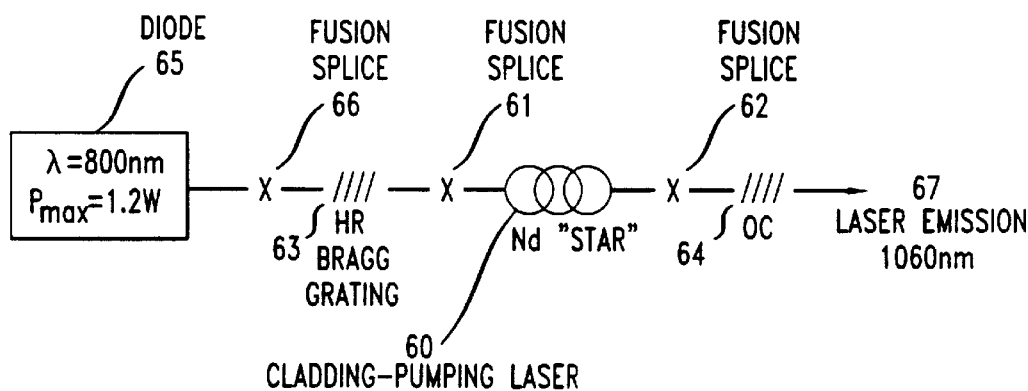
FIG. 5 is a schematic diagram of a species of the invention in which the cladding pumped structure serves as a laser.

FIG. 5 is a circuit diagram for an experimental demonstration in which a cladding-pumped structure operated as a laser 60. The demonstration serves as an operating example:

EXAMPLE 4

The particular element used was the double-clad, neodymium-doped structure of Example 1. The element was fusion/spliced at 61 and 62 to fibers contain UV-written Bragg gratings 63 and 64. Grating 63 has a high reflectivity (HR) at 1060 nm. Grating 64 had a moderate reflectivity of about 10% at 1060 nm and served as an output coupler (OC). The assemblage was pumped by means of a GaAlAs laser diode 65 fusion/spliced to the HR grating 63 at 66. The laser 65 operated as a pump, emitting 1.2 watt at a wavelength of 800 nm. Lasing threshold was 76 mW and laser emission, measured at full pump power at output 67 was 450 mW at 1060 nm. Coupling efficiency at fusion splices was not measured and the assemblage was not optimized. The measured output represented a lasing efficiency of 39%.

EXAMPLE 5

Figure 6:
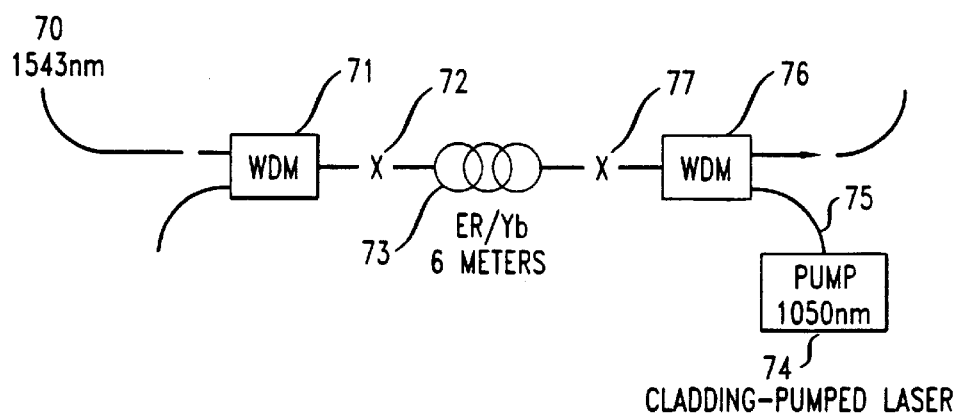
FIG. 6 is a schematic diagram showing a cladding pumped structure, serving as a pump for a rare earth doped fiber amplifier.

FIG. 6 is a schematic representation of a demonstration in which the laser of Example 4 was used to pump a rare-earth-doped fiber amplifier. The signal 70 to be amplified was a modulated carrier of wavelength 1543 introduced into coupler ("WDM") 71, and thence through fusion/splice 72 into erbium-ytterbium-doped fiber amplifier 73. The cladding-pumped laser structure 74 was used as a counterpropagating pump with emission introduced into amplifier 73 via fiber 75, WDM 76 and fusion/splice 77. The amplified signal, with laser 74 operating at its full pump power of 450 mW, and for an amplifier length of 6 meters, measured at the output of WDM 76, had a power of 160 mW—representing an amplification factor of 26 dB for an input signal of 1 mW.

The invention claimed is:

1. Apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, both core and pump cladding being composed of silica-rich glass, in which the interface is multiple-sided,

CHARACTERIZED IN THAT the interface contains longitudinal, parallel troughs projecting into the pump cladding, a longitudinal pump trough being of a depth of at least 3%, as measured relative to the radial distance from the center of the fiber to a plane making glancing contact with the interface on either side of the trough.

2. Apparatus of claim 1 in which the core is rare-earth doped, in which transferred energy pumps rare earth in the core to an excited state which upon relaxation emits output radiation of the first wavelength.

3. Apparatus of claim 2 comprising an amplifier.

4. Apparatus of claim 2 comprising a laser.

5. Apparatus of claim 2 in which the core contains erbium.

6. Apparatus of claim 5 in which the core contains erbium and ytterbium.

7. Apparatus of claim 1 further comprising an energy source coupled to the fiber.

8. Apparatus of claim 7 in which the energy source is a diode array and in which output of diodes of the array are coupled to the fiber by converging waveguides.

9. Apparatus of claim 8 in which diodes of the array are lasers, and in which the core contains erbium.

10. Apparatus of claim 1 in which the interface comprises from 3 to 6 troughs of a total area of at least 15% of the total interfacial area.

* * * * *